United States Patent [19]
Lee

[11] Patent Number: 5,788,792
[45] Date of Patent: Aug. 4, 1998

[54] METHOD FOR MANUFACTURING AN ADHESIVE TAPE

[76] Inventor: Chi-Shih Lee, No. 396, Chung Shan Road, Chingshui, Taichung Hsien, Taiwan

[21] Appl. No.: 788,832

[22] Filed: Jan. 27, 1997

[51] Int. Cl.[6] .................................................. B05D 5/10
[52] U.S. Cl. ...................... 156/148; 427/207.1; 427/209; 427/372.2
[58] Field of Search ............................ 156/148; 427/208, 427/208.4, 209, 177, 372.2, 207.1

[56] References Cited

U.S. PATENT DOCUMENTS

| | | | |
|---|---|---|---|
| Re. 32,131 | 4/1986 | Stahl | 428/325 |
| 2,251,273 | 8/1941 | Drew | 427/208 |
| 2,346,624 | 4/1944 | Straus | 427/208 |
| 2,347,643 | 5/1944 | Schieman | 427/208 |
| 2,862,613 | 12/1958 | Klemka | 427/208 |
| 2,882,183 | 4/1959 | Bond | 427/208 |
| 4,439,482 | 3/1984 | Suematsu | 427/208.4 |
| 4,992,331 | 2/1991 | DeCoste | 428/354 |
| 5,407,726 | 4/1995 | Serra | 428/343 |

OTHER PUBLICATIONS

Hawley's Condensed Chemical Dictionary, 10th Ed., Van Nostrand Reinhold Co.; (1981), pp. 920–922.

*Primary Examiner*—Daniel Stemmer
*Attorney, Agent, or Firm*—Charles E. Baxley, Esq.

[57] ABSTRACT

A method for manufacturing an adhesive tape includes step (1): weaving polyester to be a sheet of fabric which has a first side and a second side, step (2): spreading adhesive glue on the first side of the sheet of fabric, step (3): spreading silicone on the second side of the sheet of fabric, step (4): warming the first side and the second side of the sheet of fabric, step (5): spreading adhesive glue on the first side of the sheet of fabric again, step (6): warming the first side and the second side of the sheet of fabric, step (7): cutting the sheet of fabric in step (6) into desired width and step (8): wrapping the sheet of fabric in step (7) around an object such as a tube.

2 Claims, 3 Drawing Sheets

METHOD FOR MANUFACTURING AN ADHESIVE TAPE

BACKGROUND OF THE INVENTION

1. Field of the Invention

The present invention relates to a method for manufacturing an adhesive tape which is made of polyester and is bio-degadable.

2. Brief Description of the Prior Art

Conventional adhesive tapes are made of PVC which is not a bio-degadable material so that when the tapes are discarded, the PVC tape will stayed in soil for hundreds of years. It is unacceptable to use such a tape nowadays for the sake of enviornment protection.

The present invention intends to provide a method for manufacturing an adhesive tape and which comprises eight steps and the adhesive tape is made of polyester and has one side thereof spread with adhesive glue and the other side thereof spread with silicone so as to mitigate and/or obviate the above-mentioned problems.

SUMMARY OF THE INVENTION

The present invention provides a method for manufacturing an adhesive tape and which includes step (1) to step (8) wherein step (1) is to weave polyester to be a sheet of fabric which has a first side and a second side, step (2) is to spread adhesive glue on the first side of the sheet of fabric, step (3) is to spread silicone on the second side of the sheet of fabric, step (4) is to warm the first side and the second side of the sheet of fabric, step (5) is to spread adhesive glue on the first side of the sheet of fabric, step (6) is to warm the first side and the second side of the sheet of fabric, step (7) is to cut the sheet of fabric in step (6) into desired width and step (8) is to wrap the sheet of fabric in step (7) around an object.

It is an object of the present invention to provide a method for manufacturing an adhesive tape and which uses polyester to manufacture the adhesive tape.

It is another object of the present invention to provide an adhesive tape which is bio-degadable.

Other objects, advantages, and novel features of the invention-will become more apparent from the following detailed description when taken in conjunction with the accompanying drawings.

DETAILED DESCRIPTION OF THE PREFERRED EMBODIMENT

Figure 1:
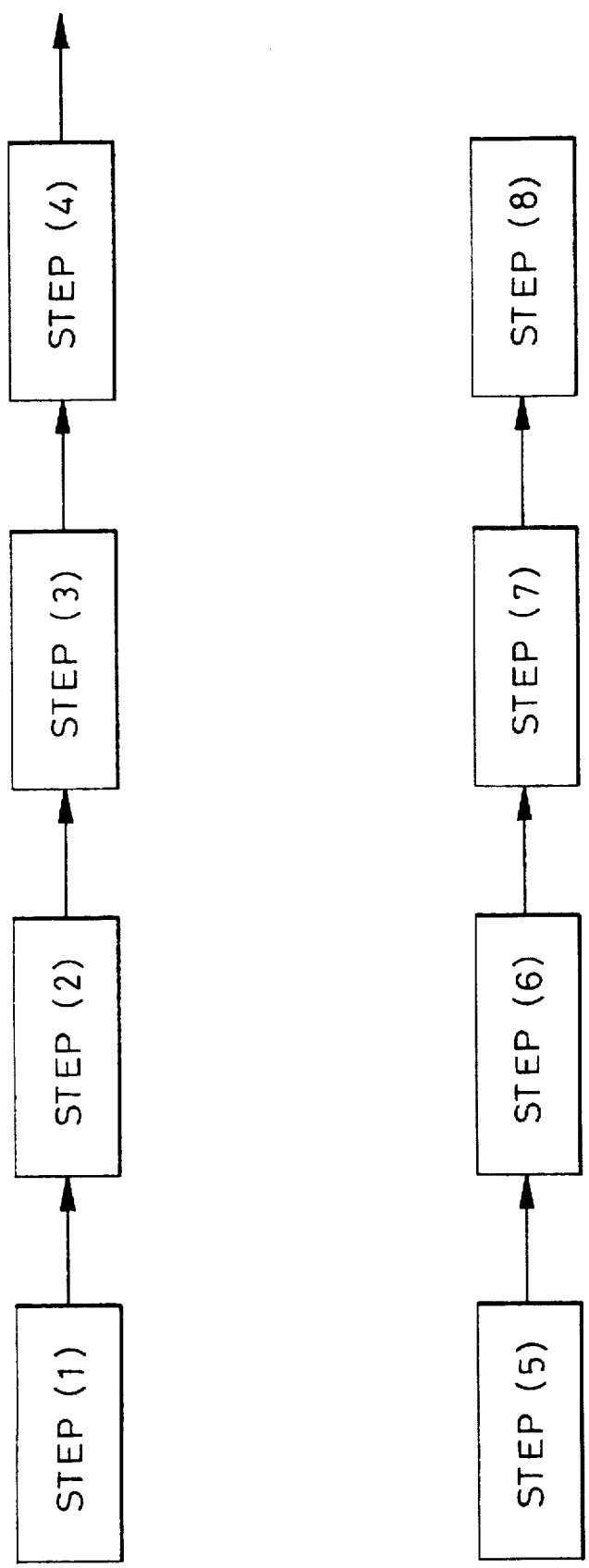
FIG. 1 is a flow chart of the steps for manufacturing an adhesive tape.
Figure 2:
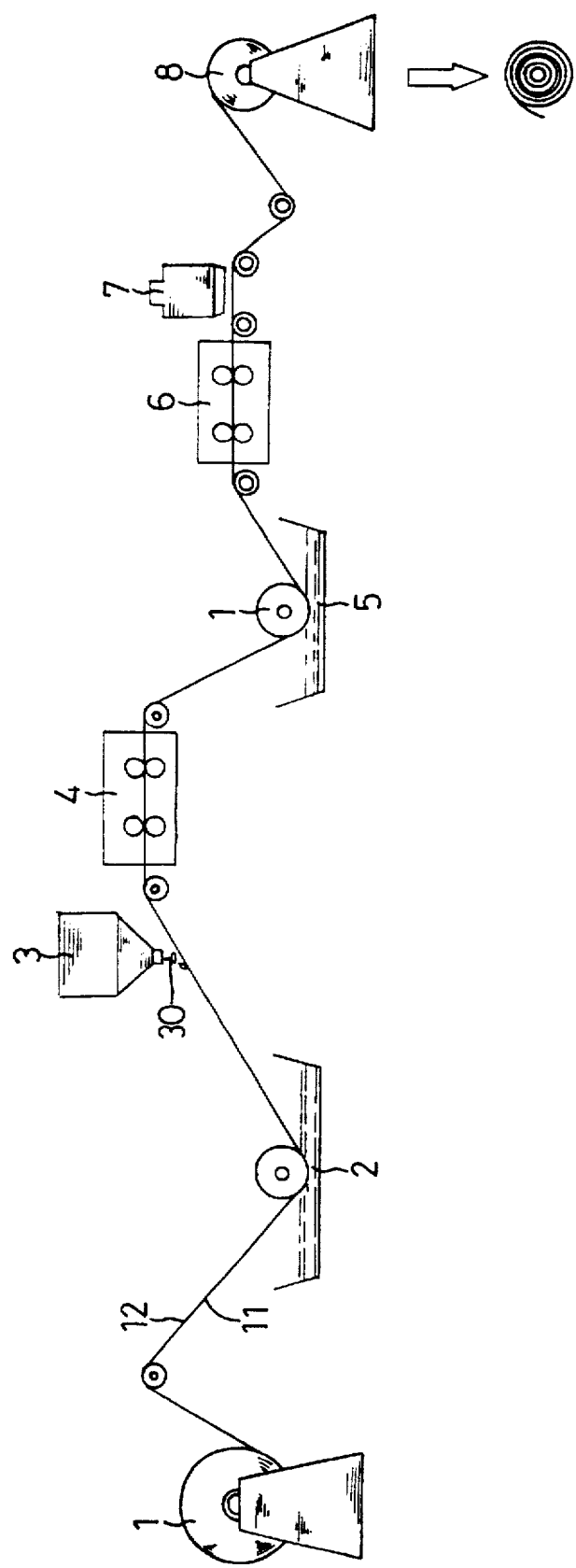
FIG. 2 is an illustrative view to show the processes for manufacturing the adhesive tape.
Figure 3:
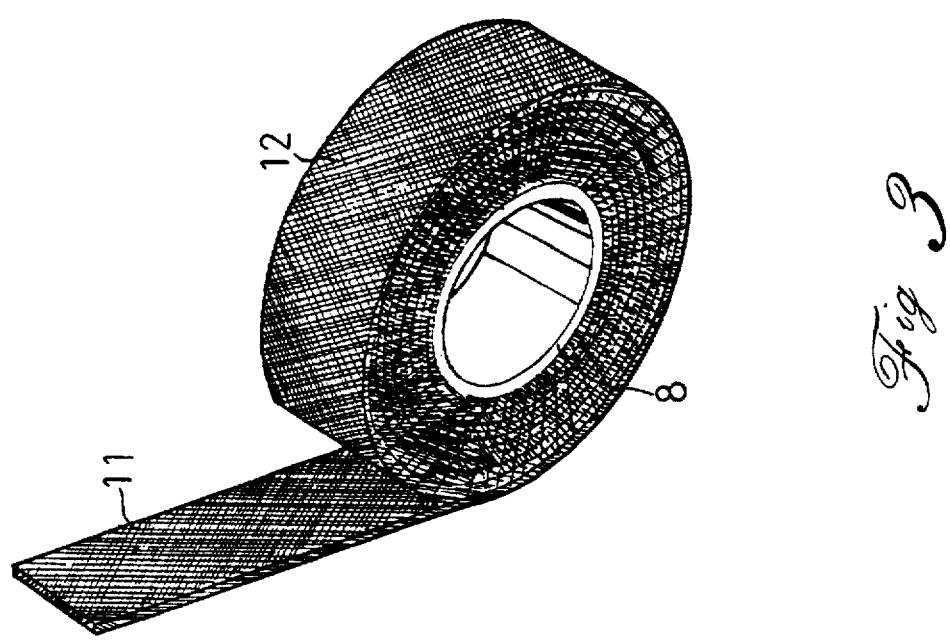
FIG. 3 is a perspective view of a roll of the adhesive tape in accordance with the present invention.

Referring to FIGS. 1 through 3, a method for manufacturing an adhesive tape in accordance with the present invention generally includes the following steps:

step (1) weaving a roll of polyester 1 to be a sheet of fabric with a thickness of 0.4 to 0.55 mm and the sheet of fabric has a first side 11 and a second side 12.

step (2): passing the sheet of fabric through a tank of adhesive glue 2 to spread the adhesive glue 2 on the first side 11 of the sheet of fabric.

step (3): spreading silicone 30 on the second side 12 of the sheet of fabric by a spray device 3.

step (4): warming the first side 11 and the second side 12 of the sheet of fabric by passing the sheet of fabric through a warming device 4 to let the adhesive glue 2 and the silicone 30 penetrate into the fabric.

step (5): passing the sheet of fabric in step (4) through a tank of adhesive glue 5 to spread the adhesive glue 5 on the first side 11 of the sheet of fabric again.

step (6): passing the sheet of fabric in step (5) through a warming device 6 to warm the first side 11 and the second side 12 of the sheet of fabric.

step (7): cutting the sheet of fabric in step (6) into desired width by a cutting device 7.

step (8): wrapping the sheet of fabric in step (7) around an object such as a tube 8.

Accordingly, the adhesive tape can be made of polyester or recycled cotton fabric such that the adhesive tape manufactured by the method can be bio-degadable.

Although the invention has been explained in relation to its preferred embodiment, it is to be understood that many other possible modifications and variations can be made without departing from the spirit and scope of the invention as hereinafter claimed.

What is claimed is:

1. A method for manufacturing an adhesive tape and comprising in sequence the following steps:

weaving polyester to form a sheet of fabric which has a first side and a second side and is bio-degradable;

spreading adhesive glue on said first side of said sheet of fabric;

spreading silicone on said second side of said sheet of fabric;

warming said first side and said second side of said sheet of fabric to have said adhesive glue and said silicone penetrate into said fabric;

spreading adhesive glue on said first side of said sheet of fabric;

warming said first side and said second side of said sheet of fabric;

cutting said sheet of fabric into desired width, and wrapping said sheet of fabric around an object.

2. The method as claimed in claim 1 wherein said sheet of fabric has a thickness of 0.4 to 0.55 mm.

\* \* \* \* \*